(12) United States Patent
Palmer

(10) Patent No.: US 11,750,677 B2
(45) Date of Patent: Sep. 5, 2023

(54) DATA TRANSMISSION FRAMING

(71) Applicant: TRIAD National Security, LLC., Los Alamos, NM (US)

(72) Inventor: David Palmer, Los Alamos, NM (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 0 days.

(21) Appl. No.: 17/500,211

(22) Filed: Oct. 13, 2021

(65) Prior Publication Data
US 2022/0038228 A1 Feb. 3, 2022

Related U.S. Application Data

(63) Continuation of application No. 16/539,380, filed on Aug. 13, 2019, now abandoned.

(60) Provisional application No. 62/718,546, filed on Aug. 14, 2018.

(51) Int. Cl.
| | |
|---|---|
| *H04L 1/00* | (2006.01) |
| *H04L 5/00* | (2006.01) |
| *H04J 13/00* | (2011.01) |
| *H04L 65/70* | (2022.01) |
| *H04L 27/36* | (2006.01) |
| *H04L 69/04* | (2022.01) |
| *H04B 7/216* | (2006.01) |
| *H04B 7/24* | (2006.01) |
| *H04J 13/10* | (2011.01) |

(52) U.S. Cl.
CPC .............. *H04L 65/70* (2022.05); *H04B 7/216* (2013.01); *H04B 7/24* (2013.01); *H04J 13/10* (2013.01); *H04L 27/36* (2013.01); *H04L 69/04* (2013.01)

(58) Field of Classification Search
CPC ....... H04B 7/216; H04B 7/24; H04J 13/0003; H04J 13/10; H04J 2011/0006; H04L 1/0006; H04L 5/0044; H04L 27/36; H04L 69/04; H04L 69/70
See application file for complete search history.

(56) References Cited

U.S. PATENT DOCUMENTS

| | | | | |
|---|---|---|---|---|
| 5,909,447 A * | 6/1999 | Cox | ..................... | H04L 7/041 370/515 |
| 5,953,327 A * | 9/1999 | Cox | ..................... | H04B 1/707 370/336 |
| 8,934,780 B2 * | 1/2015 | Yu | ..................... | H04L 27/2692 398/154 |
| 10,090,857 B2 * | 10/2018 | Bhola | ..................... | G16B 50/50 |

\* cited by examiner

*Primary Examiner* — Alpus Hsu

(57) ABSTRACT

Techniques for framing data in various data transmission contexts are described. A data framing technique may include a transmitter sending a data stream including repeating bits in alternating forward and reverse order. A receiver of the data stream may fold the data stream, and correlate portions of the folded data stream for purposes of validating the data stream and/or identifying an ID in the data stream. In at least some instances, once the receiver validates the data stream, the receiver may accept payload accompanying the data stream.

8 Claims, 6 Drawing Sheets

FIG. 4

Forward 0: 11010101
Forward 1: 00101010
Reverse 0: 10101011
Reverse 1: 01010100

Example:

| Data: | 1 | 1 | 0 | 0 |
|---|---|---|---|---|
| Sequences: | Forward 1 | Reverse 1 | Forward 0 | Reverse 0 |
| Chips: | 00101010 | 01010100 | 11010101 | 10101011 | ial instance of the first and second data portions and a second repeating alternating instance of the first and second data portions are separated by at least one bit between them in the stream.

DATA TRANSMISSION FRAMING

RELATED APPLICATIONS

This application is a continuation application and claims the benefit and priority to the U.S. patent application Ser. No. 16/539,380 that was filed on Aug. 13, 2019, which claims the benefit and priority to the Provisional Patent Application No. 62/718,546 that was filed on Aug. 14, 2018, all of which are incorporated herein by reference in their entirety.

FEDERALLY SPONSORED RESEARCH OR DEVELOPMENT

The United States government has rights in this invention pursuant to Contract No. 89233218CNA000001 between the United States Department of Energy (DOE), the National Nuclear Security Administration (NNSA), and Triad National Security, LLC for the operation of Los Alamos National Laboratory.

BACKGROUND

In some communications systems, data is transmitted as a continuous sequence of bits. Data reception, in these systems, includes determining the values of individual bits as well as grouping the individual bits into "frames."

In American Standard Code for Information Interchange (ASCII), which is a character encoding standard for electronic communication, framing data may include splitting 8-bits of one ASCII character from bits of the next ASCII character. This includes "frame synchronization," which is the determination of which bit in a sequence corresponds to the first bit of a frame.

For example, in ASCII, "a" equals 01100001, "b" equals 01100010, and so on. Thus, a continuous sequence of " . . . ababab . . . " equals . . . 01100001011000100110000101100010011000010110 0010 . . . . But, if the receiver starts at the sixth bit, for example, the signal looks like . . . 0010110001001100010110001001100001011000101 . . . . This leads to a determined continuous sequence of 00101100 and 01001100 bytes, which represent "," and "L," respectively (not "a" and "b" as transmitted).

Framing in ASCII may be indicated by inserting non-information bits into a continuous sequence of bits. For example, an individual 8-bit character may be preceded by a start bit (e.g., 0) and followed by a stop bit (e.g., 1), thereby expanding the 8-bit symbol to a 10-bit symbol. The correct framing may be found automatically after a few characters because incorrect framing does not match the values of the corresponding start and stop bits of 0 and 1 reliably.

An Extremely Low-Resource Optical Identifier (ELROI) beacon is a concept for an optical license plate that can provide unique identifier (ID) numbers for anything that goes into space. In an ELROI ID signal, flashes of light are a strictly-periodic sequence of clock ticks where a flash represents a "1" and a non-flash represents a "0." This pattern repeats every n clocks (e.g., n=127 for purposes of the following example), and the n-bit number thus represented is drawn from an alphabet of spacecraft IDs. If there is no framing mechanism, then each ID number can be read in any of n different ways, corresponding to an arbitrary choice of which bit in the data stream is the first bit, effectively requiring an alphabet of spacecraft IDs to be n times as large. The logarithm of the size of the alphabet corresponds to how much information (e.g., number of information bits when the logarithm is base-2) may be transmitted in the n bits of the ID code. The excess of n above the number of information bits can be used for error correction and other purposes, allowing consequent increased reliability at lower power levels over a noisy channel. Taking a nominal million available IDs, which represents 20 bits of information (log_2(1,000,000)~20), 127 million rotated IDs must be reserved (i.e., each basic ID number must also be represented by the rotated version where the first m bits are taken off the front and moved to the back, for m=0 . . . 126). This requires 27 bits of information to be transmitted (log_2(127,000,000)~27, effectively 20 bits of ID plus 7 bits of rotation information). The rotation information is effectively useless, as it is solely an indication of at what clock cycle the reading started, leading to a waste of 7/27 (~26%) of the information.

Code Division Multiple Access (CDMA) is a channel access method used by various radio communication technologies. In CDMA, a single symbol of information can be encoded as a pattern of chips, each of which is an elementary bit that is individually too weak to read reliably. A symbol might be n chips long, with the following symbol occupying the subsequent n chips, and so on. A "1" symbol might be a specific pattern of chips while the "0" symbol might be the pattern with each elementary bit replaced by its inverse. A framing problem in the CDMA context involves determining which chip (out of n chips) is the first chip in a symbol.

Framing techniques of the foregoing communication technologies unnecessarily use up bandwidth.

SUMMARY

The present disclosure provides improved techniques for framing data in various data transmission contexts. A data framing technique of the present disclosure includes sending consecutive transmissions of a data stream in alternating forward and reverse order. This enables a framing clock to be recovered without loss of communications bandwidth inherent in known techniques.

A transmitter may generate and send a data stream including repeating bits in alternating forward and reverse order. A receiver of the data stream may fold the data stream, and correlate portions of the folded data stream for purposes of validating the data stream and/or identifying an ID in the data stream. In at least some instances, once the receiver validates the data stream, the receiver may accept payload accompanying the data stream.

Teachings of the present disclosure may be used in binary communications systems (e.g., involving data streams of 0 and 1 values). Teachings of the present disclosure may also or alternatively be used in non-binary communications systems, such as Quadrature Amplitude Modulation (QAM), where unit symbols have more than 2 values.

An aspect of the present disclosure relates to a data transmitter comprising first circuitry configured to transmit a stream of data including repeating alternating instances of a first data portion in a forward order and a second data portion representing a reverse order of the first data portion. In at least some examples, the first data portion comprises 127 bits. In at least some examples, the stream comprises a 0 or 1 bit between the first and second data portions. In at least some examples, the first data portion is located previous and adjacent to the second data portion in the stream. In at least some examples, the first data portion is located subsequent and adjacent to the second data portion in the stream. In at least some examples, a first repeating alternating instance of the first and second data portions comprises 255 bits. In at least some examples, the second data portion comprises an inverted representation of the reverse order of the first data portion. In at least some examples, the inverted representation encodes the stream.

Another aspect of the present disclosure relates to a data receiver comprising circuitry configured to receive a stream of data including repeating alternating instances of a first data portion in a forward order and a second data portion representing a reverse order of the first data portion, and correlate the first data portion with the second data portion. In at least some examples, the circuitry is further configured to identify a palindrome sequence using the stream. In at least some examples, the first data portion comprises 127 bits. In at least some examples, the stream comprises a 0 or 1 bit between the first and second data portions. In at least some examples, the first data portion is located previous and adjacent to the second data portion in the stream. In at least some examples, the first data portion is located subsequent and adjacent to the second data portion in the stream. In at least some examples, a first repeating alternating instance of the first and second data portions comprises 255 bits. In at least some examples, the data receiver accepts payload after correlating the first data portion with the second data portion. In at least some examples, the circuitry is further configured to correlate the first data portion with the second data portion in a shift register. In at least some examples, the shift register comprises a fold point, and the circuitry comprises a XNOR gate configured to compare bits one position way from the fold point. In at least some examples, the second data portion comprises an inverted representation of the reverse order of the first data portion. In at least some examples, the inverted representation encodes the stream.

BRIEF DESCRIPTION OF DRAWINGS

For a more complete understanding of the present disclosure, reference is now made to the following description taken in conjunction with the accompanying drawings.

FIG. 4 is a conceptual diagram illustrating a Code Division Multiple Access (CDMA) data stream including repeating bits in alternating forward and reverse order according to embodiments of the present disclosure.

DETAILED DESCRIPTION

The present disclosure provides techniques for framing data in various data transmission contexts. A data framing technique of the present disclosure includes sending a data stream including repeating bits in alternating forward and reverse order. Teachings of the present disclosure may be used in binary communications systems (e.g., involving data streams of 0 and 1 values). Teachings of the present disclosure may also or alternatively be used in non-binary communications systems, such as Quadrature Amplitude Modulation (QAM), where unit symbols have more than 2 values.

Figure 1:
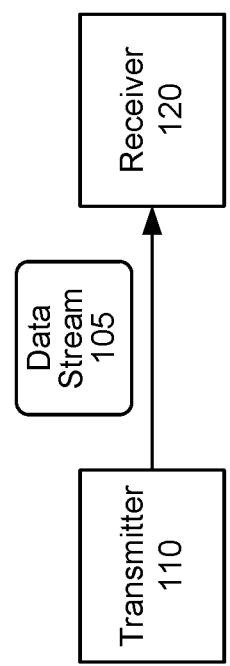
FIG. 1 is a conceptual diagram illustrating a system configured to frame data according to embodiments of the present disclosure.

As illustrated in FIG. 1, a transmitter 110 may send a data stream 105 to a receiver 120. The data stream 105 may include sequences of bits that are repeated in alternating forward and reverse orders (as illustrated in FIG. 2).

In the Extremely Low-Resource Optical Identifier (EL-ROI) context, for example, the transmitter 110 may be an optical beacon, which transmits flashes of light, attached to an object outside of the Earth's atmosphere, and the receiver 120 may be a computing device including an optical detector, configured to detect flashes of light, attached to a telescope located on or near the Earth's surface. In the Code Division Multiple Access (CDMA) context, the transmitter 110 and/or receiver 120 may be a global positioning system (GPS) device, a mobile phone, and a satellite, or some other device that communicates through CDMA protocols.

Embodiments of the present disclosure may be implemented using hardware, firmware, software, or any suitable combination of hardware, firmware, and/or software. FIG. 2 shows an example of a hardware-based implementation of possible components within the receiver 120. Although the specific example shown in FIG. 2 is hardware-based, it should be appreciated that the functionality of the illustrated components for comparing sequences of bits, etc., could alternatively be implemented using software and/or firmware in addition to or in lieu of hardware.

Figure 2:
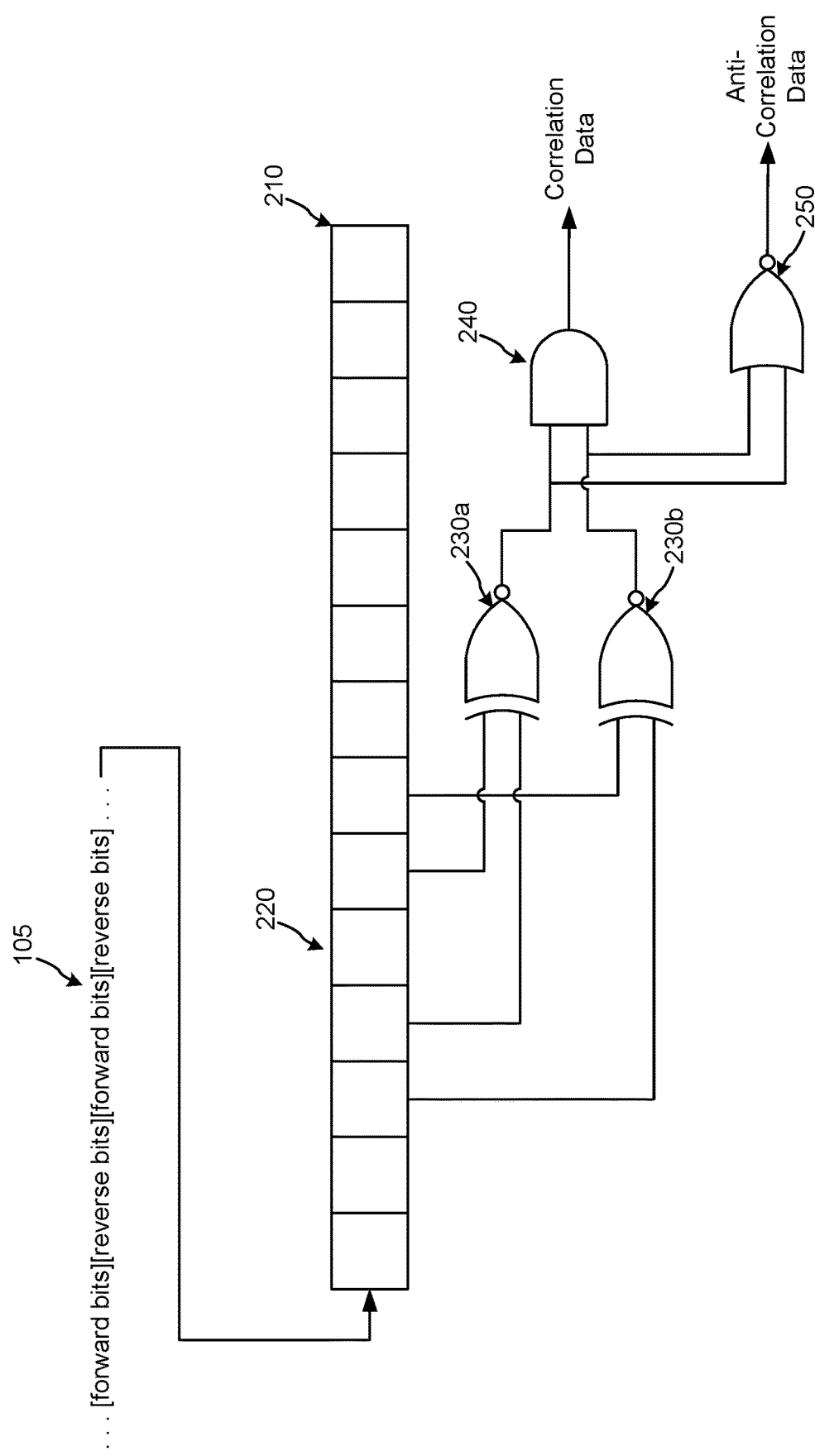
FIG. 2 is a conceptual diagram illustrating an example hardware-based implementation in which a receiver may process a data stream using a shift register.

The receiver 120 may process the data stream 105 as illustrated in FIG. 2. For example, the receiver 120 may implement a shift register 210 into which the data stream 105 is fed one bit at a time. The shift register 210 may, for example, be a first-in/first-out component such that a bit is moved an additional spot in the shift register 210 each time a new bit is added to the shift register 210. In other words, a first received bit is initially placed in a first position of the shift register 210. When a second bit is received, the first bit is moved to a second position of the shift register 210 and the second bit is placed in the first position of the shift register 210, and so on.

In the illustrated hardware implementation, the receiver 120 may include a fold point 220 corresponding to a particular position within the shift register 210. As shown, the receiver 120 may, for example, implement XNOR gates 230 that compare respective pairs of bits on either side of the fold point 220. An XNOR gate produces a "true" output when all inputs to the XNOR gate are "true" or when all inputs to the XNOR gate are "false." In other words, an XNOR gate produces a true output when all inputs to the XNOR gate are equivalent. Table 1 below illustrates potential outputs of an XNOR gate configured to receive 2 inputs.

TABLE 1

Potential outputs of an XNOR gate configured to receive 2 inputs.

| Input A | Input B | Output |
|---------|---------|--------|
| 0 | 0 | 1 |
| 0 | 1 | 0 |
| 1 | 0 | 0 |
| 1 | 1 | 1 |

Referring to FIG. 2, in an example, a first XNOR gate 230a may compare bits that are one position away from the fold point 220, a second XNOR gate 230b may compare bits that are two positions away from the fold point 220, and so on. The number of XNOR gates 230 implemented by the receiver 120 may depend on the amount of bits to be compared by the receiver 120. Thus, receivers 120 according to the present disclosure may have different numbers of XNOR gates 230.

Outputs of the XNOR gates 230 may be fed into an AND gate 240. While FIG. 2 illustrates the AND gate 240 being configured to receive outputs from two XNOR gates 230, one skilled in the art will appreciate that the AND gate 240 may be configured to receive an output from each XNOR gate 240 implemented by the receiver 120. A receiver 120 may implement a single AND gate 240, or more than one AND gate 240, to effect the desired AND operation.

An AND gate provides a true output when all the inputs to the AND gate are true. In other words, an AND gate produces a true output when all XNOR gates, feeding into the AND gate, produce true outputs. Table 2 below illustrates potential outputs of an AND gate configured to receive 2 inputs.

TABLE 2

Potential outputs of an AND gate configured to receive 2 inputs.

| Input A | Input B | Output |
|---------|---------|--------|
| 0 | 0 | 0 |
| 0 | 1 | 0 |
| 1 | 0 | 0 |
| 1 | 1 | 1 |

The AND gate 240 processes the output of each XNOR gate 230 to determine if the bits on each side of the fold point 220 are correlated. For example, the bits may be considered correlated if the bits one position from the fold point 220 match, the bits two positions from the fold point 220 match, and so on. In at least some configurations, the AND gate 240 may be configured to process at least a threshold number of XNOR gate 230 outputs. By implementing a threshold, the receiver 120 is able to minimize false correlations (e.g., recognition of correlated bits near the fold point 220, but bits further from the fold point 220 would not be correlated if further XNOR gates were implemented).

If the AND gate 240 produces an output representing the data is correlated about the fold point 220 (e.g., produces a true output), the receiver 120 may be considered to have recognized a palindromic sequence in the data stream 105. A palindromic sequence is a sequence whereby reading a data sequence in a forward order matches reading a data sequence in a reverse order. With reference to data stream 105 represented in FIG. 2, a palindromic sequence may be recognized if, for example, the fold point 220 is located between a sequence of forward bits and a sequence of reverse bits. If the receiver 120 successfully correlates the bits about the fold point 220, in at least some instances, the receiver 120 may then accept an appropriate number of bits on one side of the fold point as a payload corresponding to a desired sequence of bits. It is appreciated that a palindromic sequence may also be an interleaved palindromic sequence where the bits are interleaved (described later in this application).

In some implementations, the receiver 120 may implement one or more XOR gates rather than XNOR gates. An XOR gate produces a true output when the number of true inputs is odd. In other words, an XOR gate produces a true output when the inputs to the XOR gate are not equivalent. Table 3 below illustrates potential outputs of an XOR gate configured to receive 2 inputs.

TABLE 3

Potential outputs of an XOR gate configured to receive 2 inputs.

| Input A | Input B | Output |
|---------|---------|--------|
| 0 | 0 | 0 |
| 0 | 1 | 1 |
| 1 | 0 | 1 |
| 1 | 1 | 0 |

The receiver 120 may implement one or more XOR gates in lieu of the XNOR gates 230 shown in FIG. 2, for example, if the transmitter 110 is configured to invert the bits of the "reverse order" portions of the alternating forward and reverse order bit sequences.

Equivalently, the receiver 120 may implement a NOR gate 250 in lieu of the AND gate 240. Such inverting may, for example, create a "balanced" data stream that includes an approximately equal number of ones and zeros. Depending on the application, a receiver 120 may include either or both of the AND gate 240 or the NOR gate 250. One skilled in the art will appreciate that correlations calculations described herein may be used to perform anti-correlation calculations through use of the NOR gate 250. Table 4 below illustrates potential outputs of a NOR gate configured to receive 2 inputs.

TABLE 4

Potential outputs of a NOR gate configured to receive 2 inputs.

| Input A | Input B | Output |
|---------|---------|--------|
| 0 | 0 | 1 |
| 0 | 1 | 0 |
| 1 | 0 | 0 |
| 1 | 1 | 0 |

As noted above, in addition to or in lieu of hardware, the functionality of the receiver 120 may be implemented using software and/or firmware. For example, in some embodiments, the receiver 120 may store the data stream 105 to memory, and may perform correlation processing about various fold points within the stored data sequence until palindromic sequences of data on either side of such fold points are identified. In some implementations, the fold point that corresponds to each identified palindromic sequence greater than a threshold length may be determined to correspond to a frame clock.

The receiver 120 may not select an appropriate fold point 220 in the first instance. That is, the receiver 120 may initially select a fold point 220 that does not result in the data being correlated on either side. When this occurs, the receiver 120 may move the fold point 220 to a different position within the stored data stream, and may then process the data stream about the new fold point 220. The receiver 120 may move the fold point 220, and perform the correlation processing described above, with respect to each fold point until the data is correlated or until the receiver 120 has performed correlation processing with respect to at least a threshold number of fold points. If the receiver 120 successfully correlates the bits of the data stream 105, in at least some instances, the receiver 120 may then accept an appropriate number of bits on one side of the fold point resulting in such a correlation as a payload.

For communicating over a noisy channel, the above described gates may be replaced with non-binary analogs to improve the probability of accurately detecting the fold point. For example, the XNOR gates 230 can be replaced by arithmetic function units calculating:

$$P(A=0)*P(B=0)+P(A=1)*P(B=1)$$

where P(A=0) is the probability that input A corresponds to a zero bit, P(B=0) is the probability that input B corresponds to a zero bit, P(A=1) is the probability that input A corresponds to a 1 bit, and P(B=1) is the probability that input B corresponds to a 1 bit. The AND gate 240 can be replaced by a multiplier function unit that calculates the sum of its inputs. The fold point is most likely to correspond to the shift that has the maximum output value of the multiplier function unit.

The above described data framing techniques may be implemented, for example, in Extremely Low-Resource Optical Identifier (ELROI) communications systems. In an ELROI communications system, an optical license plate can be provided by unique identifier (ID) numbers for anything that goes into space. In an ELROI ID signal, flashes of light are a strictly-periodic sequence of clock ticks where a flash represents a "1" and a non-flash represents a "0." This pattern repeats every n clocks, and the n-bit number thus represented is drawn from an alphabet of spacecraft IDs. The receiver detects individual photons of light from both the signal flashes and from background noise sources and accumulates them over many repetitions of the pattern to give a list of n photon counts. A higher photon count indicates a greater probability of the corresponding bit in the ID being a "1".

Figure 3:
FIG. 3 is a conceptual diagram illustrating an Extremely Low-Resource Optical Identifier (ELROI) data stream including repeating bits in alternating forward and reverse order according to embodiments of the present disclosure.

For an ELROI communications system, instead of transmitting a 127-bit ID (or some other n-bit ID) over and over (as performed by known techniques), a data stream may repeat the ID in forward and reverse order (as illustrated in FIG. 3). This data stream includes an "IDDI" palindrome sequence. In an ELROI communications system, the palindrome sequence may be 254 bits long.

After each "IDDI" sequence, a "0" may be added (as illustrated in FIG. 3). It is appreciated that the bit "0", in this nonlimiting example, that has been inserted after "IDDI" sequence may be referred to as a spacer bit. This produces a repetition sequence of 255 bits long. The 0 may be added as an indicator to the receiver 120 of where the first bit of a forward "ID" is located. One skilled in the art will appreciate that the 0 bit does not need to be added between a reverse ID and a forward ID when correlation, but not direction, of bits is important.

The foregoing ELROI framing technique provides a framing solution with minimal additional bandwidth needed. The signal power remains (e.g., taking only 1 extra bit time every 254 bits to transmit).

The framing techniques of the present disclosure may be implemented, for example, in Code Division Multiple Access (CDMA) communications systems. A CDMA communications system is a multi-access system that permits numerous transmitters to send information simultaneously over a single communication channel. CDMA communications systems include global positioning systems (GPSs), mobile phone networks, and satellite communications systems. Data to be transmitted is combined with a pseudo-random code. The pseudo-random code may be a string of binary bits.

A CDMA communications system implementing the presently disclosed framing techniques may transmit the pseudo-random bits in repeating forward and reverse order, with the bits inverted or not to encode data ones and zeros (as illustrated in FIG. 4). A receiver 120 of the CDMA data stream may correlate (and anti-correlate) the data about a fold point. From this correlation, the code may be validated by the receiver 120 and the receiver 120 may, thereafter, accept accompanying payload.

It is appreciated that the following example is provided to illustrate the use of the circuitry, as described above, to provide a framing solution. In some nonlimiting examples, the unique identifier, ID, may be a 20 bit ID. The 20 bit ID may be expanded into 127 bits to provide an Error Correcting Code. In this example, the 127 bit ID may be represented as <a1, a2, a3, . . . , a127>. The transmitter may generate a palindromic sequence for the 127 bit ID by reversing the order of bits and concatenating the reversed 127 bit ID to the 127 bit ID separated by a spacer bit. In this nonlimiting example, the following data stream is generated and transmitted by the transmitter, [<a1, a2, a3, . . . , a127>, <a127, a126, a125, . . . , a1>,<spacer bit>]. It is appreciated that the transmitter may retransmit the same palindromic sequence a number of times. For example, if the palindromic sequence is transmitted twice then the transmitted bit stream [b1, b2, . . . , b255] may include [<a1, a2, a3, . . . , a127>, <a127, a126, a125, . . . , a1>,<spacer bit>,<a1, a2, a3, . . . , a127>, <a127, a126, a125, . . . , a1>,<spacer bit>]. It is appreciated that ELROI beacon may continue this repetition for a certain period or even indefinitely, e.g., from launch of ELROI until it re-enters and burns up decades later. It is appreciated that in some embodiments the palindromic sequence may be a 127-bit Bose-Chaudhuri-Hocquenghem (BCH) binary (127, 22) error correcting code that encodes a 22-bit identification number, the reverse order, and a spacer bit, in any combination. For example, in some embodiments, the palindromic sequence may be the forward sequence followed by reverse and spacer bit while in a different embodiment it may be the forward sequence followed by a spacer bit followed by the reverse sequence while in yet other embodiments it may be reverse sequence followed by a spacer bit and the forward sequence, etc. As such, any description with respect to the ordering of the forward sequence, reverse sequence, and the spacer bit is for illustration purposes and should not be construed to limit the scope of the embodiments. In some embodiments, the palindromic sequence may be an interleaved palindromic sequence, e.g., [a1, a127, a2, a126, . . . , a127, a1, spacer bit]. It is appreciated that the information may be encoded in any fashion and the discussions with respect to the palindromic sequence or interleaved palindromic sequence is for illustrative purposes and should not be construed as limiting the scope of the embodiments. For example, in some embodiments, the ID may be encoded in a fixed forward pattern while the same information may be modified in fixed reverse pattern of the palindromic sequence. It is further appreciated that the embodiments are described with respect to encoding the ID in a fixed pattern for illustrative purposes and should not be construed as limiting the scope of the embodiments. For example, in some embodiments, the ID may be encoded in variable patterns.

It is appreciated that once the palindromic sequence is generated, the data stream may be re-sequenced, if desired. For example, in some embodiments, the data stream may include a fixed subsequence (i.e., same subsequence repeated and it may be of the same fixed length, however, a different subsequence may be used for different transmissions) that includes the sequence of symbols. The data stream may also include a derived subsequence that may be of the same length as the fixed subsequence such that each symbol in the fixed subsequent is mapped between values of the corresponding symbols, e.g., corresponding bits are bits that are equal such as 0:0, 1:1, or the corresponding bits are inverse of one another such as 0:1, 1:0, or the corresponding bits are implemented as 4-symbol-value such as Quadrature Amplitude Modulation (4-QAM) and the correspondence is 90-degree rotation through the constellation such as 00:01, 01:11, 11:10, 10:00, just to name a few. It is appreciated that the data stream may also include zero or more fixed-length spacer (e.g., one spacer bit, two spacer bits, etc.) subsequences. Moreover, in some embodiments, the data stream may include zero or more fixed-length additional subsequences where the bits of the component subsequences are arranged within the overall subsequence in a known ordering. It is appreciated that the known ordering allows a process that matches the location of each bit of fixed subsequence to the location of the corresponding bit of the derived sequence when the process is applied to the overall subsequence, e.g., in a trivial cyclic permutation.

It is appreciated that in some embodiments, the ordering of the data stream may include the fixed subsequence in forward ordering followed by the derived subsequence in reverse ordering followed by a spacer sequence, e.g., a single bit or more. It is appreciated that, as described, the data stream may have any ordering and the discussion with respect to forward ordering followed by reverse ordering followed by a spacer bit is for illustration purposes only and should not be construed as limiting the scope of the embodiments. For example, in some embodiments, the data stream may be ordered in reverse ordering followed by forward ordering followed by a spacer bit. In yet another example, the data stream may be ordered by a spacer bit followed by a forward ordering which is followed by a reverse ordering.

It is appreciated that the fixed subsequence of one ELROI encodes the ID of that ELROI and is therefore different from the fixed subsequence of another ELROI that encodes the ID of that respective ELROI. According to some embodiments, the set of encoded identification values may be selected in order to have a large hamming distance between the members of the set.

It is appreciated that a transmitter may generate the data stream in a given fashion, as described above, e.g., palindromic sequence generated based on the ID of a given ELROI, BCH value derived from the ID, etc. The data stream may be transmitted after it is generated, and the transmission of that data may be repeated indefinitely, as described above. It is appreciated that in some embodiments, the data stream (e.g., palindromic sequence), may be generated by a component such as a processor and transmitted subsequent to its generation by a transmitter. As such, the transmitter generating the data stream (e.g., palindromic sequence) is for illustrative purposes and should not be construed as limiting the scope of the embodiments. In this nonlimiting example, the received data stream includes a 255-bit code that includes an ID of the transmitter that may have been expanded to a 127-bit BCH error-correcting code, followed by the same 127 bits in reverse order, followed by a spacer bit with a value 0 as an example. In other words, the 255-bit code may be represented as [b1, . . . , b255]=[<a1, a2, a3, . . . , a127>, <a127, a126, a125, . . . , a1>,<spacer bit>], as discussed above.

The receiver in some embodiments detects an ELROI transmitter with specific parameters, e.g., clock cycle (1 millisecond as an example), pulse duration (1 microsecond as an example), number of bit-code (255-bits as an example), etc. According to some embodiments, the receiver may detect photons over several minutes by pointing a telescope at the satellite with ELROI onboard. For illustration purposes, the receiver receives the data stream but the framing of data stream may not be known but that can be detected/extracted based on information from the transmitter. For illustration purposes, data stream z1, z2, z3, . . . , z255 may be received and the framing of the palindromic sequence may be unknown. In other words, the receiver may have no knowledge of whether the received bit z1 corresponds to a1, a2, . . . , a127 in forward or reverse or even to a spacer bit. However, it is appreciated that the framing of data stream may be determined if the spacer bit (or its position/location) within the received data stream, i.e., z1, z2, z3, . . . , z255, is determined.

It is appreciated that the embodiments are described with respect to the receiver receiving the palindromic sequence from one ELROI for illustration purposes and should not be construed as limiting the scope of the embodiments. For example, the receiver may be configured to receive data streams from different ELROIs and to separate the data streams associated with each.

It is appreciated that for ELROI, as an example, the data stream may be generated by wrapping the data with the expected window size, e.g., 255. As such, the best estimates for 0 value or 1 value probability for each bit value (i.e., zn) in the window for n where n ranges between 1 to 255 may be determined. Moreover, if the bit time is 1 ms, as an example, the probabilistic value of z1 may be obtained by measuring it at 0 ms, 255 ms, 510 ms, etc., after an arbitrary start time and combining the measurements. Similarly, z2 in this example is a combination from 1 ms, 256 ms, 511 ms, etc.

In one nonlimiting example, a window size corresponding to the palindromic sequence is selected by the receiver. In this example, the window size is 255 bits long to include the 127 forward bit ID, spacer bit, and 127 reverse bit ID, is selected. In this example, 255 bits, e.g., <z1, z2, . . . , z255>, <z9, z10, . . . , z263>, etc., of the received data stream, e.g., z1, z2, z3, . . . , z510, is selected. For illustration purposes <z1, z2, . . . , z255> is used. It is appreciated that if the signal is weak in comparison to noise, the values of the received bits are probabilistically determined. For example, the probability that z1 is a 0 based on the measured value z0 may be represented as $P(z0=0|z0)$. If the bit value is known to be either a zero or a one, then the sum of those probabilities is unity or $P(z0=0|z0)+P(z0=1|z0)=1$.

It is appreciated that the probabilities may be accurately calculated, e.g., under conditions for Poisson distribution hold. However, it is appreciated that even inaccurate probabilities or approximations may be used when the distributions are not known. In general, the probability that bits m and n are equal may be represented as:

$$P(zm=zn|zm,zn)=P(zm=0|zm)P(zn=0|zn)+P(zm=1|zm)P(zn=1|zn).$$

Accordingly, the true bit values of <z1, z255> correspond to the 255 bits of the transmitted code, i.e., <b1, . . . , b255> but cyclically permuted with unknown phase. For example, phase=17 results in z18 corresponding to b1 or a1 of the transmitted code. It is desirable to determine the phase in order to allow further processing and analysis. As such, for each candidate phase, the probability of making the observed measurement, i.e., <z1, . . . , z255> in this example, is made based on the expected pattern of the repeated bits in the transmission. The phase may be determined based on selecting the most likely probability. As described above, b1 which is a1 is equal to b254 which is also a1 because of palindromic sequence. As such, if the determined phase is 17 then z17=z15 which is equivalent to b1=b254. It is appreciated that the corresponding probability for a given phase is the product of the probabilities of equal bit values for each of the corresponding pairs of bits at that phase.

As an example, the relative probability that the received bit z1 is the spacer bit is discussed for illustrative purposes and it is determined as:

$$P(z1 \text{ is a spacer bit})=P(z2=z255)*P(z3=z254)* \ldots *P(z128=z129),$$

because if z1 is the spacer bit then the received bit stream is <spacer bit>,<a1, a2, a3, . . . , a127>, <a127, a126, a125, . . . , a1>. P(z2=z255) illustrates the probability that the second received bit has the same value as the $255^{th}$ bit since palindromic sequence was generated and transmitted by the transmitter, then if the received bit z1 is the spacer bit then bit z2 and z255 are the forward and reversed bit corresponding to a1 in the 127 bit ID. It is appreciated that the probability of a pair of bits having a same value can be determined based on a number of photons received for each corresponding bit. Similarly, P(z3=z254) illustrates the probability that the third received bit has the same value as the $254^{th}$ bit corresponding to a2. As such, a relative probability value for bit z1 being a spacer bit can be determined by the receiver based on the number of photons received associated with each bit.

It is appreciated that the relative probability that the received bit z2 is the spacer bit can similarly be calculated, as described above. In that case, <z1, z2, . . . , z255> would match <a1><spacer bit>, <a1, a2, a3, . . . , a127>, <a127, a126, a125, . . . , a2>. As such, P(z2 is a spacer bit)=P (z3=z1)*P(z4=z255)*P(z5=z254) . . . *P(z129=z130). It is appreciated that the process is repeated 255 times in total to determine the relative probability of each received data bit being the spacer bit before the data stream is repeated. In other words, the process of determining the relative probability of received data bit being the spacer bit, as described above, is performed for z1, z2, z3, z4, z5, z255. The normalized probability of a received data bit being the spacer bit is obtained by dividing the relative probability for that bit by the sum of all relative probabilities.

It is appreciated that the probability with the highest value may represent the correct bit position that corresponds to the spacer bit. In this example and for illustration purposes, it is assumed that the probability of z7 being the spacer bit has the highest value in comparison to probability of other bits, i.e., z1, z2, z6, . . . , z8, z9, z10, . . . , z255, being the spacer bit. It is therefore determined that the fold point, i.e., spacer bit, is at the received bit z7, and it is selected by the receiver.

It is appreciated that the receiver, selects the folding point, i.e., position of the spacer bit, and performs other processing on the received data stream in order to extract the bit values for each received bit. For illustration purposes since z7 is determined to be the spacer bit, the receiver determines the probability of two adjacent bits of the spacer bit having the same value based on the photons received. For example, the receiver may determine the probability of a bit pair z6 and z8 having a value 1 based on the received photons, and the receiver may further determine the probability that the bit pair z6 and z8 having a value 0 based on the received photons because z7 was determined to be the spacer bit and therefore by definition z8 must have the same value as z6 in a palindromic sequence. In this nonlimiting embodiment and for illustration purposes, the receiver may determine the probability of z6 having a value 1 to be 0.70, i.e., P(z6=1)= 0.70, based on the number of photons received and the probability of z8 having a value 1 to be 0.60, i.e., P(z8=1)=0.60 based on the number of photons received. The probabilities of the respective bits having a value of zero are the complements of these, i.e., P(z6=0)=0.3 and P(z8=0)= 0.40. Accordingly, the receiver determines the relative probabilities of each combination of bit values, based on photon counts, by multiplying the individual bit probabilities, e.g., P(z6=0, z8=0)=0.3*0.4=0.12, P(z6=0, z8=1)=0.3*0.6=0.18, P(z6=1, z8=0)=0.7*0.4=0.28, P(z6=1, z8=1)=0.7*0.6=0.42, and disregarding the knowledge that z6 and z8 are describing the same ID bit, a1. To derive the probable value of the ID bit, a1, the probabilities of the cases where z6=z8 is normalized and the discrepant cases are ignored, which may be represented as follows:

$$P(a1=0)=P(z6=0,z8=0)/(P(z6=0,z8=0)+P(z6=1, z8=1))= 0.12/(0.12+0.42)=0.222.$$

It is appreciated that P(a1=1) may similarly be evaluated to be 0.778. Thus, in this illustrative example the receiver determines that the bit a1 is more likely to have a value of 1 than a value 0, with a confidence of ~78%.

It is appreciated that the process described above, i.e., determining probability that two bits in the pair have a value 1 versus having a value 0 based on the number of photons received for each respective bit, is repeated for each bit pair of the received data streams, as described above, until the value probabilities for each ID bit a1, a2, . . . a127 is determined. The set of value probabilities is then compared to the catalog of ELROI ID values to determine the most likely ID and the confidence that the ID is correct.

It is appreciated that the process as described above to identify the position of the spacer bit in the received data stream is for illustration purposes only and should not be construed as limiting the scope of the embodiments. For example, it is appreciated that in some embodiments, the window size, as described above, on a received data stream may be used and correlation between two portions of the received data is determined for each received bit being assumed to be the spacer bit. In other words, correlation between <z1, z2, z127> and <z129, z130, z255> is determined assuming that the z128 is the spacer bit. In order to create symmetry between the two portions of the received data, the received data may be repeated, assuming that other received data bits are spacer bits. For example, correlation between <z2, z3, z128> and <z130, z131, z255, z1> is determined assuming that z129 is the spacer bit. Similarly, correlation between <z3, z4, z129> and <z131, z132, z255, z1, z2> is determined assuming that z130 is the spacer bit. It is appreciated that this process is repeated assuming that each received bit is a spacer bit. In other words, it is assumed that each received bit is a spacer bit and correlation between the two data portions, as described above, is determined. In this nonlimiting example, 255 correlation values are determined by assuming that each received bit is a spacer bit. The highest correction value is then selected by the receiver as the spacer bit because the transmitted data by the transmitter is a palindromic sequence, thereby creating a highest correlation when the correct bit position is selected as the spacer bit.

It is appreciated that the process described above may determine the most likely candidate for the spacer bit. However, under some circumstances, several plausible spacer bit candidates may be identified, and as such, the process may be repeated for each candidate and the most likely ID may be determined based on the combination of probabilities of the spacer bit and corresponding ID. It is also appreciated that the spacer bit may be a 1 or a 0 and any discussions with respect to the actual value of the spacer bit is for illustrative purposes and should not be construed as limiting the scope of the embodiments. Moreover, it is appreciated that the discussion of the location of the spacer bit, e.g., between forward and reverse, between reverse and forward, etc., is for illustrative purposes and should not be construed as limiting the scope of the embodiments. Furthermore, it is appreciated that the reversed ID may be direct or inverted, i.e., bit flipped. As such, in inverted ID the probability P(zj!=zk) instead of P(zj=zk). Additionally, Poisson distribution is assumed for the photon counts, for illustration purposes. However, other detector modalities, e.g., Gaussian distribution, may be assumed. It is appreciated that non-Poisson/Gaussian background sources may be considered in assigning probabilities.

It is appreciated that in other embodiment, a different method may be used to identify the spacer bit. In a system where transmission is characterized with Poisson statistics as opposed to Gaussian, a different methodology may be employed. For example, probability that a given received bit and its bit pair is a 1 or a 0 is determined based on a number received photons for each received bit because the bits are symmetric with respect to a spacer bit position in palindromic sequence, e.g., z1 and z255 if z127 is assumed to be a spacer bit, z2 and z254, etc., the probabilities for the pair bits are added, then squared and summed. The process is repeated assuming a different received bit is a spacer bit and until each received bit is assumed to a spacer bit. The received bit with the highest value is determined to be the spacer bit.

It is appreciated that the embodiments have been described with respect to finding the location of the spacer bit for illustrative purposes only and should not be construed as limiting the scope of the embodiments. For example, it is appreciated that a similar process may be used to identify other bits and their respective positions. As such, the use of the spacer bit is also described for illustrative purposes and should not be construed as limiting the scope of the embodiments. For example, in some embodiments, a forward and reverse order bits may be used as the palindromic sequence without using a spacer bit. Similarly, in some embodiments, more than one spacer bit may be used, e.g., two spacer bits in sequence, two spacer bits interleaved, etc. Moreover, it is appreciated that the embodiments are described with respect to optical units, optical receiver, optical detectors, etc., for illustrative purposes and should not be construed as limiting the scope of the embodiments. For example, a transmitter (i.e., non-optical) may transmit a signal based on the ID of ELROI and a receiver (i.e., non-optical) may detect the signal strength. The transmitted sequence and the position of a bit, e.g., a spacer bit, may be determined by a similar process as described above based on the signal strength (as opposed to the number of photons as described above).

Figure 5:
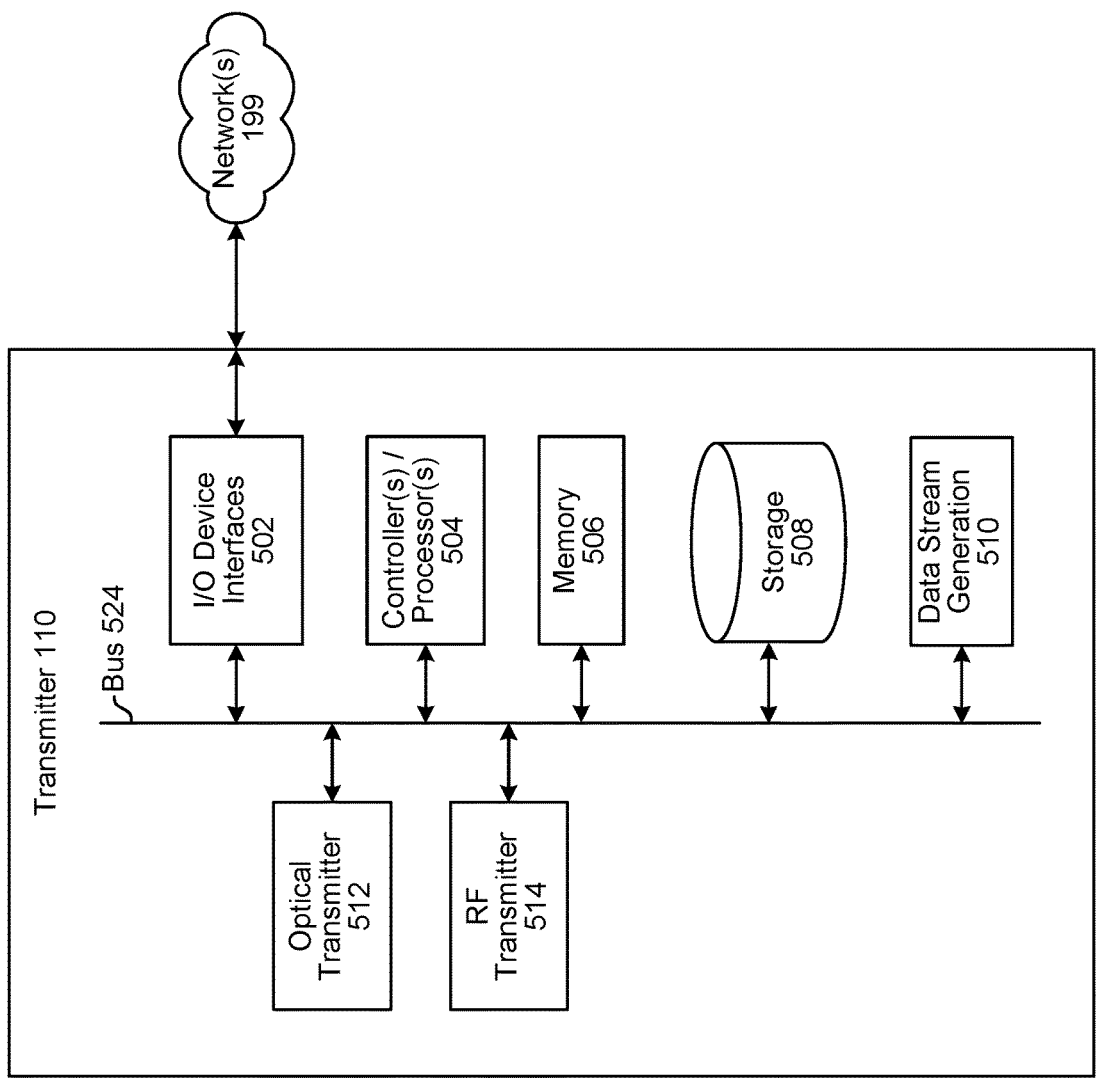
FIG. 5 is a block diagram conceptually illustrating example components of a transmitter according to embodiments of the present disclosure.
Figure 6:
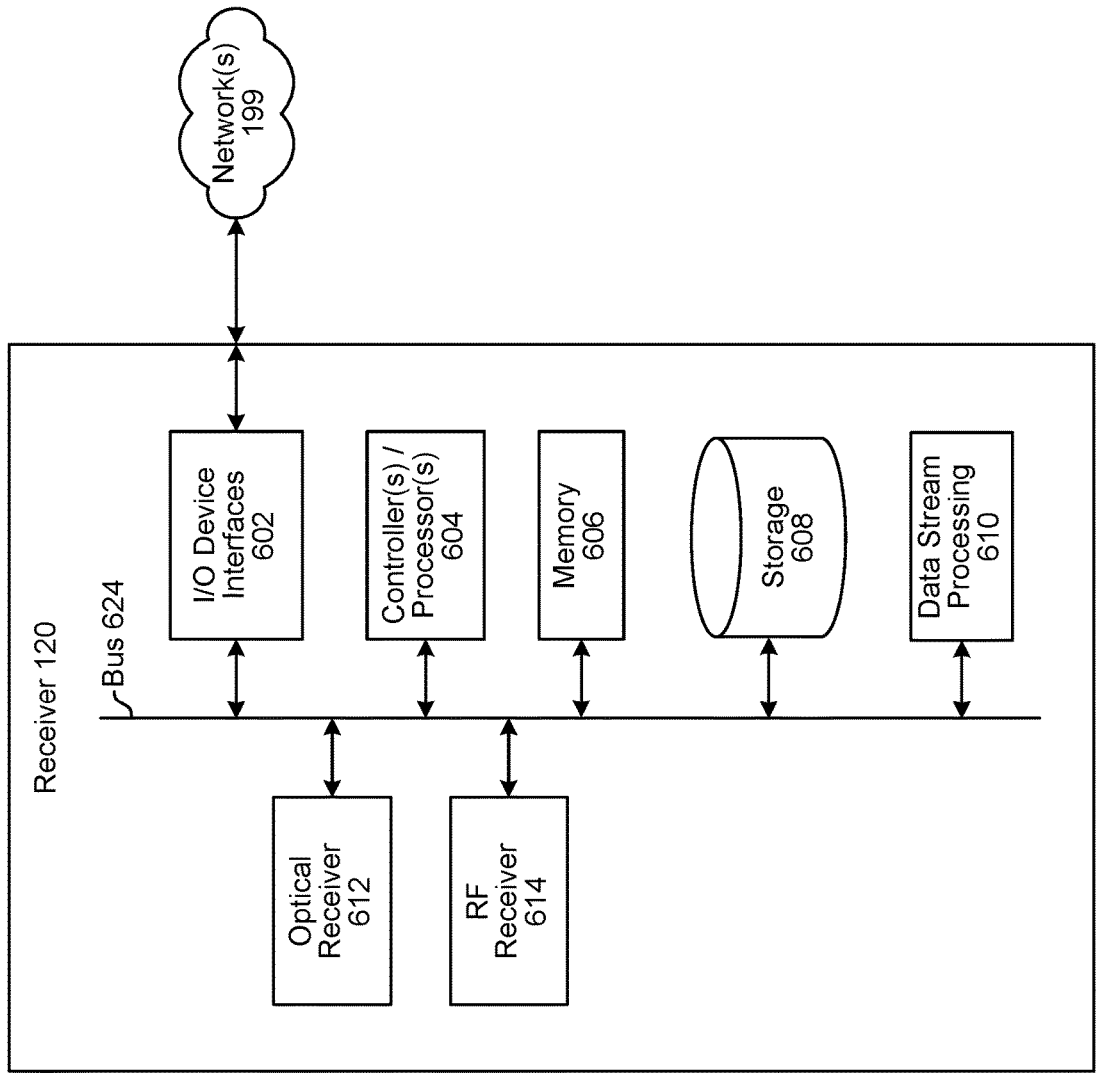
FIG. 6 is a block diagram conceptually illustrating example components of a receiver according to embodiments of the present disclosure.

FIG. 5 is a block diagram conceptually illustrating the transmitter 110 according to the present disclosure. FIG. 6 is a block diagram conceptually illustrating the receiver 120 according to the present disclosure.

Each of these devices (110/120) may include one or more controllers/processors (504/604), which may each include a central processing unit (CPU) for processing data and computer-readable instructions, and memory (506/606) for storing data and instructions of the respective device. The memories (506/606) may individually include volatile random access memory (RAM), non-volatile read only memory (ROM), non-volatile magnetoresistive memory (MRAM), and/or other types of memory. Each device (110/120) may also include a data storage component (508/608) for storing data and controller/processor-executable instructions. Each data storage component (508/608) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (502/602).

Computer instructions for operating each device (110/120) and its various components may be executed by the respective device's controller(s)/processor(s) (504/604), using the memory (506/606) as temporary "working" storage at runtime. A device's computer instructions may be stored in a non-transitory manner in non-volatile memory (506/606), storage (508/608), or an external device(s). Alternatively, some or all of the executable instructions may be embedded in hardware or firmware on the respective device in addition to or instead of software.

Each device (110/120) includes input/output device interfaces (502/602). A variety of components may be connected through the input/output device interfaces (502/602). Additionally, each device (110/120) may include an address/data bus (524/624) for conveying data among components of the respective device. Each component within a device (110/120) may also be directly connected to other components in addition to (or instead of) being connected to other components across the bus (524/624).

Via the input/output device interfaces (502/602), the devices (110/120) may send and receive data. Such data transmission and/or receipt may utilize wireless local area network (WLAN) (such as WiFi) communications, Bluetooth communications, satellite communications, wireless network radio communications (such as a radio capable of communication with a wireless communication network such as a Long Term Evolution (LTE) network, WiMAX network, 3G network, 4G network, 5G network, etc.), or some other communications modality presently or not yet known. A wired connection, such as Ethernet, may also be supported.

Referring to FIG. 5, the transmitter 110 may include a data stream generation component 510. The data stream generation component 510 may be configured to generate a data stream including repeating bits in alternating forward and reverse order. The data stream generation component 510 may also be configured to associate a data stream with payload, in at least some instances.

The transmitter 110 may include an optical transmitter 512 configured to transmit optical signals. Many optical signal transmitting devices are known in the art. The optical transmitter 512 may be an art known device and one skilled in the art will appreciate which art known optical signal transmitting device to implement in a given scenario.

The transmitter 110 may include a radio frequency (RF) transmitter 514 configured to transmit RF signals. Many RF signal transmitting devices are known in the art. The RF transmitter 514 may be an art known device and one skilled in the art will appreciate which art known RF signal transmitting device to implement in a given scenario.

Referring to FIG. 6, the receiver 120 may include a data stream processing component 610. The data stream processing component 610 may be configured to correlate portions of data streams for purposes of validating the data streams and/or identifying IDs in the data streams.

The receiver 120 may include an optical receiver 612 configured to receive/detect optical signals. Many optical signal receiving/detecting devices are known in the art. The optical receiver 612 may be an art known device and one skilled in the art will appreciate which art known optical signal receiving/detecting device to implement in a given scenario.

The receiver 120 may include a RF receiver 614 configured to receive/detect RF signals. Many RF signal receiving/detecting devices are known in the art. The RF receiver 614 may be an art known device and one skilled in the art will appreciate which art known RF signal receiving/detecting device to implement in a given scenario.

The concepts disclosed herein may be applied within a number of different devices and computer systems.

The above aspects of the present disclosure are meant to be illustrative. Many modifications and variations of the disclosed aspects may be apparent to those of skill in the art. Persons having ordinary skill in the field of computers and data transmissions should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosure may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

While the present disclosure has been particularly described in conjunction with specific embodiments, it is evident that many alternatives, modifications, and variations will be apparent to those skilled in the art in light of the foregoing description. It is therefore contemplated that the appended claims will embrace any such alternatives, modifications, and variations as falling within the true spirit and scope of the present disclosure.

What is claimed is:

1. A system comprising:
   a transmitting device comprising:
      a transmitter configured to repeatedly transmit a palindromic sequence associated with a unique identifier (ID) as a data stream to a receiver device external to the transmitting device, wherein the palindromic sequence that includes forward order of bits, reverse order of bits, and a spacer bit; and
   the receiver device comprising:
      a receiver configured to receive the data stream from the transmitting device, wherein the receiver is configured to receive and detect a signal strength associated with a data bit of the data stream; and
      a receiver processor configured to determine a location of a position bit within a subset of bits selected from the received data stream, wherein the location of the position bit is determined by calculating a probability for each bit within the subset of bits being the position bit, wherein the probability is calculated based on the signal strength associated for the each bit within the subset of bits, and wherein the receiver processor selects a bit from the subset of bits with a highest probability value as the position bit.

2. The system of claim 1, wherein the transmitter comprises an optical unit configured to transmit photons, and wherein receiver comprises an optical unit configured to receive and detect a number of photons associated with the each bit of the data stream.

3. The system of claim 2, wherein the receiver processor is further configured to determine a value associated with one bit of the subset of bits based on determining a probability that the one bit within the subset of bits has a value one based on a number of detected photons for the one bit and further based on determining a probability that the one bit within the subset of bits has a value zero based on a number of detected photons for the one bit.

4. The system of claim 3, wherein the receiver processor is further configured to determine the value associated with the one bit of the subset of bit further based on determining a probability that a symmetric bit within the subset of bits has a value one based on a number of detected photons for the symmetric bit and further based on determining a probability that the symmetric bit within the subset of bits has a value zero based on a number of detected photons for the symmetric bit, wherein the symmetric bit is a same number of bits away from the position bit as the one bit.

5. The system of claim 4, wherein the receiver processor is further configured to determine a value associated with each bit of the subset of bits by repeating the determining of probabilities for the each bit of the subset of bits.

6. The system of claim 5, wherein the ID associated with the transmitting device is determined based on the determined value for the each bit within the subset of bits.

7. The system of claim 1, wherein the transmitting device includes Extremely Low-Resource Optical Identifier (ELROI) beacon and wherein the ID is associated with the ELROI.

8. The system of claim 1, wherein the transmitting device is housed on a satellite orbiting the earth.

* * * * *